(12) United States Patent
Murden et al.

(10) Patent No.: US 6,940,564 B2
(45) Date of Patent: Sep. 6, 2005

(54) DISPLAY SUBSTRATE AND DISPLAY DEVICE

(75) Inventors: Vega Murden, London (GB); Peter W. Green, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 286 days.

(21) Appl. No.: 10/099,758

(22) Filed: Mar. 15, 2002

(65) Prior Publication Data

US 2002/0135708 A1 Sep. 26, 2002

(30) Foreign Application Priority Data

Mar. 23, 2001 (GB) .............................................. 0107404

(51) Int. Cl.$^7$ ................................................ G02F 1/13
(52) U.S. Cl. ......................................... 349/1; 381/190
(58) Field of Search ............................. 349/1; 367/178, 367/179, 180, 181; 381/190; 257/59

(56) References Cited

U.S. PATENT DOCUMENTS

| | | | |
|---|---|---|---|
| 5,130,829 A | | 7/1992 | Shannon ...................... 359/59 |
| 5,146,435 A | * | 9/1992 | Bernstein .................... 367/181 |
| 5,303,210 A | * | 4/1994 | Bernstein .................... 367/181 |
| 5,335,210 A | | 8/1994 | Bernstein .................... 367/163 |
| 5,452,268 A | * | 9/1995 | Bernstein .................... 367/181 |
| 5,940,015 A | | 8/1999 | Thornton et al. ............. 341/20 |
| 5,956,292 A | * | 9/1999 | Bernstein .................... 367/140 |
| 6,427,017 B1 | * | 7/2002 | Toki ........................... 381/190 |

FOREIGN PATENT DOCUMENTS

| | | | |
|---|---|---|---|
| EP | 0979992 | 2/2000 | ............ G01L/9/00 |
| GB | 2343811 A | 5/2000 | ........... H04R/17/00 |
| WO | WO0009440 | 2/2000 | ............ B81B/3/00 |
| WO | WO0012428 | 3/2000 | ............ B81B/3/00 |

OTHER PUBLICATIONS

"Piezoelectric Cantilever Microphone and Microspeaker", Seung S. Lee et al., Journal of Microelectromechanical Systems, vol. 5, No. 4, Dec. 1996.

"Design and Fabrication of Silicon Condenser Microphone Using Corrugated Diaphragm Technique", Quanbo Zou et al., Journal of Microelectromechanical System, vol. 5, No. 3, Sep. 1996.

* cited by examiner

Primary Examiner—Tarifur R. Chowdhury
Assistant Examiner—David Y. Chung (57) ABSTRACT

A display substrate comprising a plate, for example a glass plate, on which display elements, e.g. pixels comprising pixel electrodes and thin-film-transistors, and an acoustic transducer, e.g. a microphone, speaker or buzzer, formed from thin film layers over a cavity, are formed. The cavity may be provided by powderblasting through the depth of the glass plate. The display substrate with integrated acoustic transducer may be incorporated in a display device, e.g. a liquid crystal display device. Also described is a discrete acoustic transducer, comprising a plate of an insulating material, a cavity in the plate, a plurality of layers that have been deposited on the plate, and a moveable member formed from the deposited layers and positioned over the cavity.

24 Claims, 7 Drawing Sheets

DISPLAY SUBSTRATE AND DISPLAY DEVICE

The present invention relates to display substrates, and display devices, for example liquid crystal display devices, incorporating display substrates. The present invention also relates to acoustic transducers.

Many electrical products, for example portable computers, personal organisers, and mobile telephones, include one or more display devices and one or more acoustic transducers.

Known display devices include liquid crystal, plasma, polymer light emitting diode, organic light emitting diode and field emission display devices. Such devices typically comprise two opposing display substrates with an electrically controllable light modulation layer or array between the two display substrates. The light modulation layer or array is provided either on one of the display substrates or in a gap between the two display substrates. A typical liquid crystal display device, with one of the display substrates having an active matrix of thin film transistors (TFTs) is disclosed in U.S. Pat. No. 5,130,829.

Examples of commonly used acoustic transducers are microphones, speakers and piezoelectric buzzers. Often electrical products require two or more acoustic transducers. For example, mobile telephones typically require a microphone for voice input, a speaker for audio output, e.g. speech, and a buzzer to attract a user's attention.

There is a trend for electrical products to provide increasing levels of functionality, and consequently more information is required to be displayed to users of the products. Hence larger area display devices are required. Conversely, however, there is a trend for products to be made smaller, especially in the case of portable equipment. For example, ever smaller mobile telephones require ever larger displays for purposes of displaying text messages and Internet content.

Consequently the space available for components such as acoustic transducers, in products also including display devices, is becoming increasingly scarce. A known solution for alleviating this problem is to provide and use smaller acoustic transducers. However, generally, as components are reduced in size, their unit production costs increase. Also, their assembly, connection and testing in an end product becomes more burdensome.

Considering, in isolation, the provision of small acoustic transducers, it is known within the field of acoustic transducers (quite separately from consideration of their use with display devices) to form acoustic transducer units using thin film layers deposited on silicon wafers. Such acoustic transducers are disclosed in "Design and Fabrication of Silicon Condenser Microphone Using Corrugated Diaphragm Technique", Quanbo Zou et al., Journal of Microelectromechanical Systems, Vol. 5, No. 3, September 1996; "Piezoelectric Cantilever Microphone and Microspeaker", Seung S. Lee et al., Journal of Microelectromechanical Systems, Vol. 5, No. 4, December 1996; and EP-A-0 979 992. Multiple acoustic transducers can be formed on each silicon wafer in conventional batch processing manner, and individual acoustic transducers thereafter formed by slicing of the wafer. The production techniques involved are often termed "micromachining".

These types of acoustic transducers can be produced in miniature form. The thin film layers can also be used to form integral semiconductor circuitry required for operation of the acoustic transducers. However, in products where space is at a premium due to the inclusion of one or more display devices, the use of such acoustic transducers would not fully resolve the problem of lack of space, because the packaging of each acoustic transducer would need its own space in the end product. Moreover, insertion and connection of the acoustic transducer in the end product would be particularly burdensome due to the very miniaturisation advantage that such acoustic transducers might provide.

Overall, therefore, it is desirable to provide an alternative solution, other than simple reduction in size of acoustic transducers, to the problems described above.

In a first aspect, the present invention provides a display substrate, comprising: a plate; one or more display components formed on the plate; and an acoustic transducer formed on the plate over a cavity.

In a second aspect, the present invention provides a display device comprising a display substrate according to the first aspect.

The present invention derives from the idea of providing an integrated display and acoustic transducer by forming the acoustic transducer as an integrated part of one of the display substrates of a display device. Thus space can be saved in a product requiring both a display device and an acoustic transducer. Moreover, the requirement to separately insert and connect the acoustic transducer into an end product is removed as these operations occur when the display device is inserted and connected. This is particularly advantageous when the acoustic transducer is formed in miniature form on the substrate of the display device.

Preferably, the plate from which the display substrate is formed is of glass, quartz or a plastics material. This allows particularly economical display devices to be produced as such materials are commonly used as substrate materials for conventional display devices.

In a third aspect, the present invention provides a method of forming a display substrate, comprising: providing a plate; forming one or more display components on the plate; and forming an acoustic transducer on the plate over a cavity.

In a fourth aspect, the present invention provides a method of forming a display device, comprising forming a display substrate using a method according to the third aspect.

The cavity may be formed in the plate, in which case the cavity may extend through the whole depth of the substrate. Preferably, the cavity is produced by powderblasting, as this allows the provision of cavities in strong plate materials.

The cavity may alternatively be formed between the acoustic transducer and a surface of the plate, by the use of one or more sacrificial layers. This allows flexibility of design.

The joint provision of an acoustic transducer as well as one or more display elements on the same substrate allows process steps, in particular deposition and/or etching of various thin film layers, to be shared, thus simplifying the production process. The acoustic transducer may be a microphone or speaker, comprising a fixed electrode and a moveable diaphragm comprising a diaphragm electrode. In this case, the diaphragm electrode is preferably formed from a same layer of conductor as at least a first part of respective display elements formed on the display substrate. Further, the fixed electrode is preferably formed from a same layer of conductor as at least a second part of respective display elements formed on the display substrate. The moveable diaphragm may further comprise an insulation layer, in which case this insulation layer is preferably formed from a same insulation layer as at least a part of respective display elements, thus simplifying the production process. However, the insulation layer (or indeed any other layer) may be provided separately for the purpose of optimising the performance characteristics of the acoustic transducer and the display element individually.

Preferably the display substrate is an active matrix display substrate for a liquid crystal display device, and the display elements include thin-film transistors and pixel electrodes. In this case, the diaphragm electrode is preferably formed from a same layer of conductor as the gates of the thin-filmtransistors, and the fixed electrode is preferably formed from a same layer of conductor as the pixel electrodes.

When the display device is intended for an end product that requires more than one acoustic transducer, a plurality of acoustic transducers may be provided on one display substrate, thus multiplying the benefits derived from the present invention.

In a fifth aspect, the present invention provides an acoustic transducer, comprising: a substrate of an insulating material; a cavity in the substrate; a plurality of layers which have been deposited on the substrate; and a moveable member formed from the deposited layers and positioned over the cavity.

In a sixth aspect, the present invention provides a method of forming an acoustic transducer, comprising: providing a substrate of an insulating material; depositing a plurality of layers on the substrate; forming a cavity in the substrate; and forming, from the deposited layers, a moveable member positioned over the cavity.

Preferably, a fixed electrode is formed opposing the moveable member; the moveable member is formed from a moveable electrode formed from a first metal layer, the first metal layer being one of the plurality of layers, and an insulating layer, the insulating layer being another one of the plurality of layers; and the fixed electrode is formed from a second metal layer, the second metal layer being another one of the plurality of layers.

Preferably, the cavity is formed by powderblasting.

The fifth and sixth aspects are derived from the realisation that acoustic transducers derived as part of the above mentioned first to fourth aspects of the present invention also provide potential benefits over known acoustic transducers even when not integrated as such on a display substrate. For example, by forming such acoustic transducers by depositing layers on an insulating substrate and forming a cavity in the insulating substrate, effective miniature acoustic transducers can be made from strong cheap substrate materials, thus reducing packaging and/or processing and/or material costs compared to the known silicon wafer based acoustic transducers discussed earlier above. Alternatively, or additionally, acoustic transducers according to the fifth and sixth aspects may, by virtue of their features common with display substrates, be provided such that their external physical form or packaging makes their incorporation into end products alongside display devices more straightforward than that of conventional acoustic transducers.

The dependent claims define, in addition to the various preferences discussed above, yet further preferences or possibilities of the present invention.

The above described and other aspects of the invention will be apparent from and elucidated with reference to the embodiments described hereinafter.

Embodiments of the present invention will now be described, by way of example, with reference to the accompanying drawings, in which.

It should be noted that the figures are diagrammatic and not drawn to scale. Relative dimensions and proportions of parts of these figures have been shown exaggerated or reduced in size, for the sake of clarity and convenience in the drawings.

Figure 1:
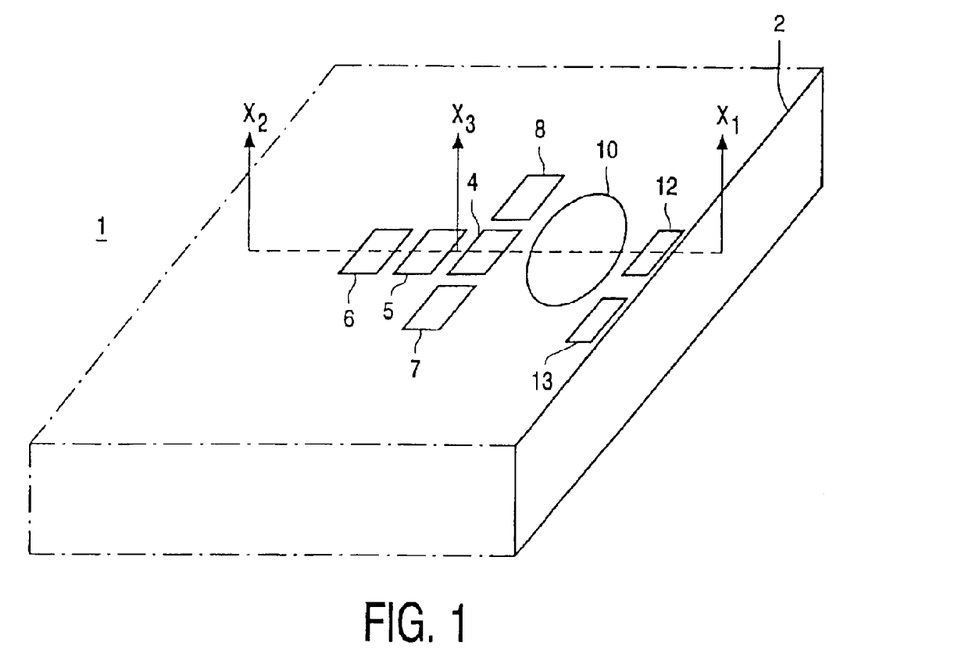
FIG. 1 is a schematic illustration of part of a display substrate with an integrated microphone.

FIG. 1 is a schematic illustration of part of a display substrate 1 provided in a first embodiment. The display substrate 1 comprises a glass plate 2. As with conventional display substrates, plural display elements are provided on the upper surface (as viewed in FIG. 1) of the glass plate 2. The term "display element" is used herein to refer to any item included as a part of a display substrate that contributes to the display functionality of the display substrate. In this embodiment, the plural display elements include an array of pixels. A large number of such pixels are provided, but for clarity only five of these, namely pixels 4, 5, 6, 7 and 8, are shown in FIG. 1.

A microphone 10, i.e. one type of acoustic transducer, is also provided on the upper surface of the glass plate 2. In this embodiment the shape of the microphone as viewed from above the upper surface of the glass plate 2 is approximately circular. The microphone 10 is a condenser microphone comprising a fixed electrode and a vibrating electrode. An external contact is provided for each of these microphone electrodes, i.e. contact 12 for the vibrating electrode and contact 13 for the fixed electrode. In operation of the microphone 10, the capacitance between the two electrodes varies as the vibrating electrode moves relative to the fixed electrode in response to sound waves. By connecting a suitable circuit to the two external contacts, this varying capacitance may be measured and processed.

Figure 2:
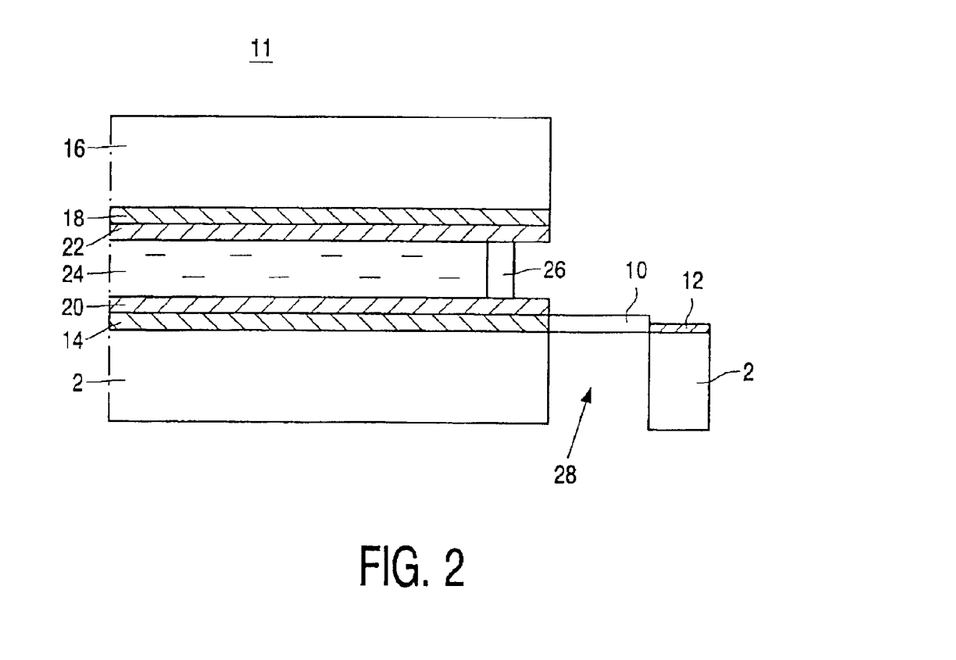
FIG. 2 is a schematic illustration of a cross-section of a liquid crystal display device comprising the display substrate illustrated in FIG. 1.

The pixels 4, 5, 6, 7, 8 include TFTs and form an active matrix array such that the display substrate 1 may be used as an active matrix display substrate of a liquid crystal display device 11, as schematically illustrated in FIG. 2 where the display substrate 1 is shown in cross-section through the line $X_1$–$X_2$ of FIG. 1. In FIG. 2, the glass plate 2, the microphone 10 and the contact 12 are individually indicated. However, for clarity, the pixels 4, 5, 6 and any other display elements along the line $X_1$–$X_2$ are represented together as an active matrix layer 14 formed on the surface of the glass plate 2.

The glass plate 2 has a cavity 28 extending through the whole depth of the glass plate 2. The microphone 10 is formed over the cavity 28. The cavity 28 is of approximately circular cross-section, and this provides the approximately circular shape of the microphone 10, as will be explained in more detail below.

The contact 12 for the vibrating electrode is provided on the glass plate 2 next to the microphone 10 at a position outside of the area covered by the active matrix layer 14.

The area of the glass plate 2 that is covered by the active matrix layer 14 is used to form a liquid crystal display area as follows. The glass plate 2 has a liquid crystal orientation layer 20 deposited over the active matrix layer 14. The liquid crystal display device 11 further comprises a second glass plate 16, with a common electrode 18 thereon, spaced apart from the glass plate 2. The second glass plate 16 has a liquid crystal orientation layer 22 deposited over the common electrode 18. A liquid crystal layer 24, comprising twisted nematic liquid crystal material, is disposed between the orientation layers 20, 22 of the two glass plates 2, 16. A seal 26 is provided between the two orientation layers 20, 24 at the edge of the area of coverage of the liquid crystal layer 24.

These and other details of the liquid crystal display device (in so far as the area corresponding to the active matrix layer 14, in contrast to the microphone 10, is concerned) are the same, and operate the same, as the liquid crystal display device disclosed in U.S. Pat. No. 5,130,829, the contents of which are contained herein by reference.

Alternatively, the liquid crystal layer may extend over the microphone in order to simplify the production process, in which case the microphone will still respond to sound by virtue of vibrations passing through the liquid crystal layer, although this will usually have a detrimental affect on the quality of the microphone response.

Figure 3:
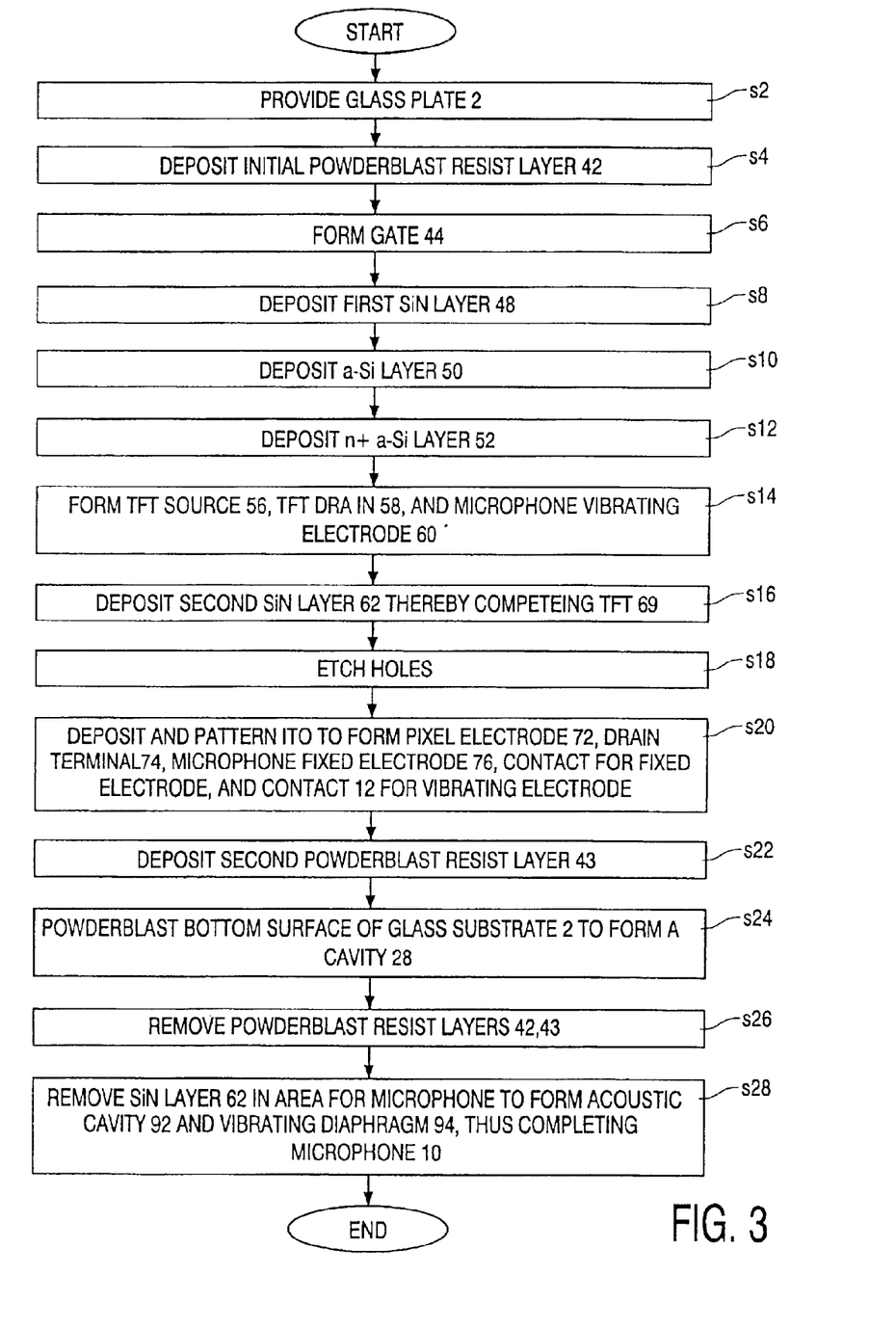
FIG. 3 is a flowchart showing process steps employed for producing the display substrate shown in FIGS. 1 and 2.

FIG. 3 shows the process steps employed in this embodiment for producing the display substrate 1. These process steps will now be described, with the aid of FIGS. 4a–f which schematically illustrate the build-up of the features of the display substrate 1 as the process progresses. In FIGS. 4a–f, the display substrate 1 is shown in terms of the cross-section through the line $X_1$–$X_3$ of FIG. 1, i.e. to include the contact 12 for the vibrating electrode, the microphone 10, and just the single pixel 4. It will be appreciated however, that the procedures described below in relation to the pixel 4 are in fact performed at the same time for the whole array of pixels.

Figure 4A:
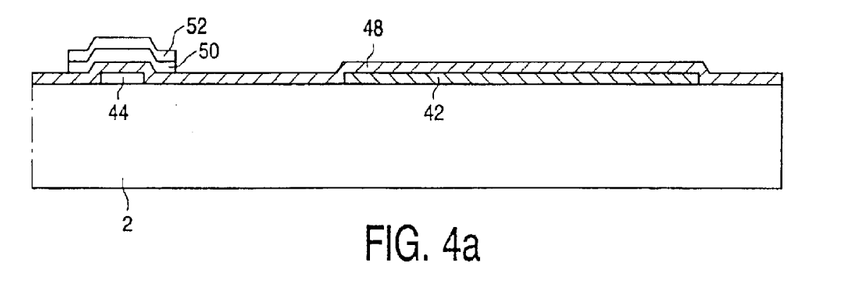
FIGS. 4a–f schematically illustrate the build-up of the features of the display substrate 1 as the process of FIG. 3 progresses.

The features shown in FIG. 4a are formed as follows. At step s2, the glass plate 2 is provided. At step s4, an initial powderblast resist layer 42 is deposited on the surface of the glass plate 2 over the area where the microphone 10 is to be provided. At step s6, a metal layer is deposited, and patterned to form a gate 44 where the TFT of the pixel 4 is to be formed. At step s8, a first silicon nitride (SiN) layer 48, i.e. an insulation layer, is deposited over substantially the whole area of the glass plate 2. At steps s10 and s12, two amorphous silicon layers, for the TFT being formed, are deposited. More particularly, at step s10 an undoped amorphous silicon layer 50 is deposited over the first SiN layer 48 above the gate 44, followed at step s12 by an n+amorphous silicon layer 52, thus forming the overall structure shown in FIG. 4a.

Figure 4B:
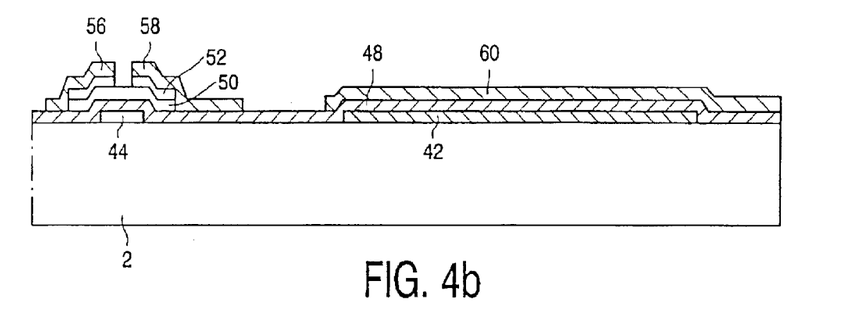

The additional features shown in FIG. 4b are formed as follows. At step s14, a further metal layer is deposited and patterned to provide a source 56 and a drain 58 for the TFT being formed, and an electrode which will serve as the microphone vibrating electrode 60 of the microphone being formed. The n+amorphous silicon layer 52 is also removed in a small area over the gate 44. Thus the overall structure shown in FIG. 4b is arrived at.

Figure 4C:
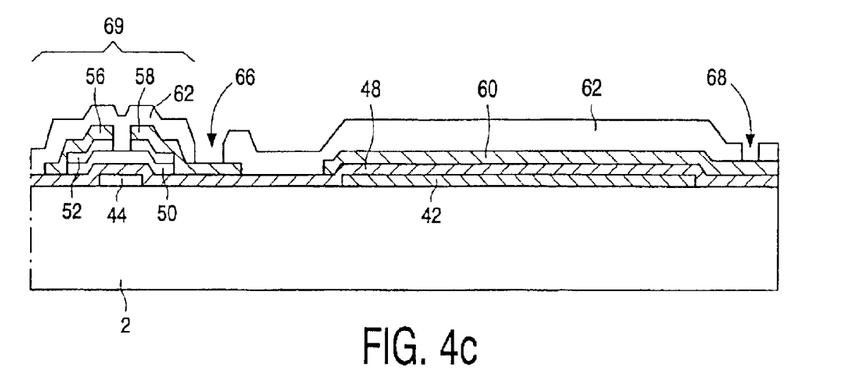

The additional features shown in FIG. 4c are formed as follows. At step s16, a second SiN layer 62, i.e. insulation layer, is deposited over substantially the whole area of the glass plate 2. By virtue of this, fabrication of the TFT 69 is essentially completed. At step s18, through holes are etched in the second SiN layer 62, in particular a hole 66 over the drain 58, and a hole 68 over an extended portion of the microphone vibrating electrode 60. Thus the overall structure shown in FIG. 4c is arrived at.

Figure 4D:
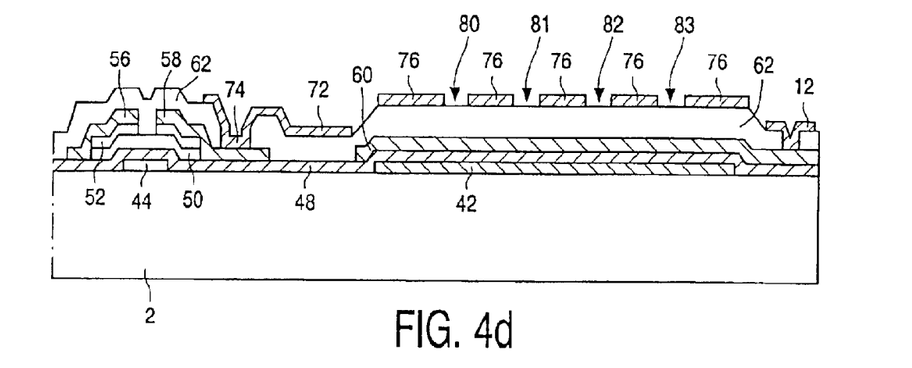

The additional features shown in FIG. 4d are formed as follows. At step s20, a transparent electrode layer of indium tin oxide (ITO) is deposited over the second SiN layer 62 and the holes 64, 66 and 68 therein, and patterned to form a pixel electrode 72, a drain terminal 74 connecting the drain 58 of the TFT 69 to the pixel electrode 72, an electrode which will serve as the microphone fixed electrode 76, the microphone fixed electrode contact 13 mentioned earlier with reference to FIG. 1 (but not shown here in FIG. 4d as it does not fall on the cross-section line $X_1$–$X_3$), and the contact 12 (mentioned earlier with reference to FIGS. 1 and 2) for the microphone vibrating electrode 60. In order that the microphone fixed electrode 76 will remain substantially stationary in operation whilst the earlier described microphone vibrating electrode 60 will vibrate, the ITO layer is made thicker than the joint thickness of the first SIN layer 48 and the microphone vibrating electrode 60, by an amount dependent on the relative stiffness of the materials involved. The microphone fixed electrode 76 is patterned such as to include gaps 80, 81, 82, and 83 therein, such that when the microphone fixed electrode 76 is viewed from above it is in the form of a mesh. (When the microphone is completed, these gaps will form acoustic air holes, as will be described in more detail below.) Thus the overall structure shown in FIG. 4d is arrived at.

Figure 4E:
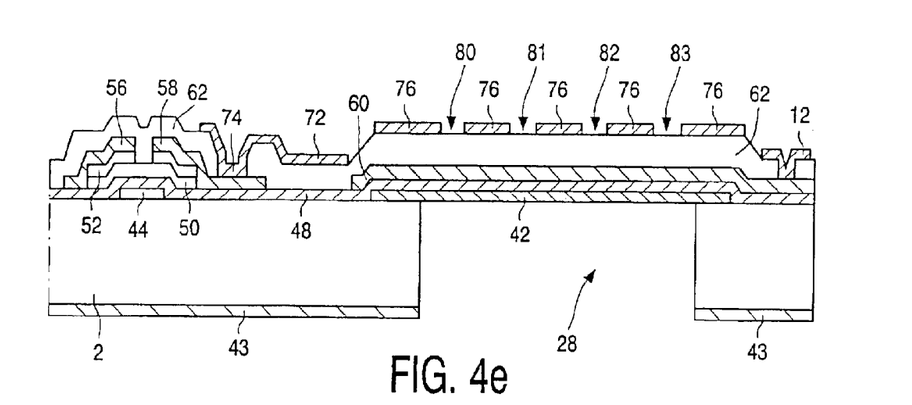

The additional features shown in FIG. 4e are formed as follows. At step s22, a second powderblast resist layer 43 is deposited over the whole area of the bottom surface of the glass plate 2 except for the area corresponding to where the microphone 10 is to be provided. In this embodiment the cavity is of diameter ~1 mm–2 mm, although generally this may be varied according to the required acoustic response of the microphone. At step s24, powderblasting, using iron pellets, is performed on the bottom surface of the glass plate 2, to form a cavity 28 through the whole depth of the glass plate 2. During the powderblasting process, the remaining area of the bottom surface of the glass plate 2 is protected by the second powderblast resist layer 43. As the cavity nears completion, i.e. as the powderblasting works its way toward the underneath of the first SiN layer 48 in the area of the cavity, the first SiN layer 48 is protected by the first powderblast resist layer 42. During the powderblasting process the top surface of the overall structure may optionally be protected by a layer, for example an organic photoresist, applied thereto before the powderblasting and removed by etching thereafter. In addition, the front side of the plate may be protected by, for example, a plate (e.g. metal) which is used to mount the glass plate during the powderblasting. Further details of the powderblasting process and powderblasting resists are given below. Thus the overall structure shown in FIG. 4e is arrived at.

Figure 4F:
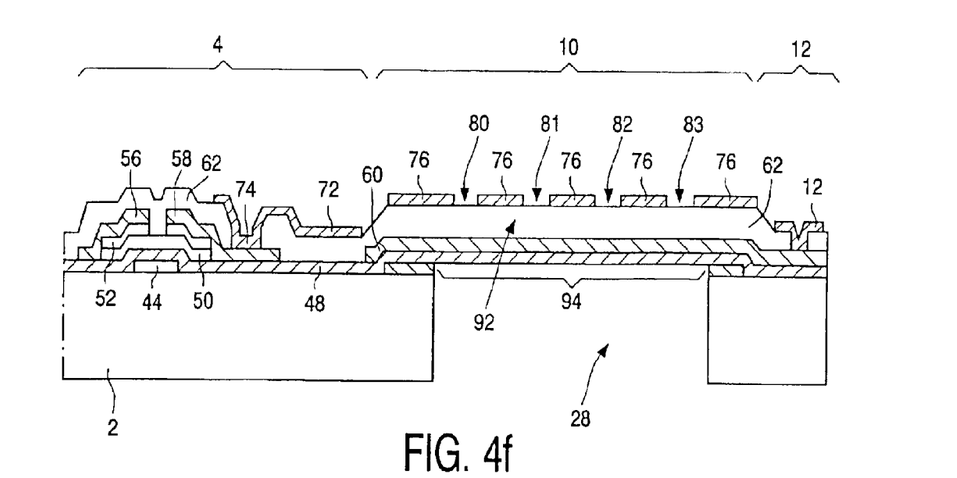

The additional features shown in FIG. 4f are formed as follows. At step s26, the powderblast resist layers 42 and 43 are removed by etching. At step s28, the second SiN layer 62 is removed by etching in the area where the microphone 10 is to be provided. This leaves an acoustic cavity 92 between the microphone fixed electrode 76 and the microphone vibrating electrode 60, and consequently the earlier mentioned gaps 80, 81, 82 and 83 form acoustic air holes connected to the acoustic cavity 92. A further effect of the removal of the second SiN layer 62 in this area is to leave the first SiN layer 48 in the area over the cavity 28 and the microphone vibrating electrode 60 suspended over the cavity. In this way the microphone vibrating electrode 60, and the portion of the first SiN layer 48 attached thereto, together form a vibrating diaphragm 94 of the microphone 10. Furthermore, the removal of the second SiN layer 62 at step s28 completes the formation of the microphone 10, which comprises the microphone fixed electrode 76 and the vibrating diaphragm 94, along with the acoustic cavity 92 and acoustic air holes 80, 81, 82 and 83 defined thereby.

In addition to the microphone 10, other completed functional items indicated in FIG. 4f are the pixel 4 and the microphone vibrating electrode contact 12.

The pixel 4 comprises the pixel electrode 72 and its associated TFT 69. The pixel 4 (and the other pixels, and other TFT connections such as gate leads, not shown, of the rest of the area of the glass plate 2 ) constitute the display elements provided in the active matrix layer 14 and discussed earlier in relation to FIGS. 1 and 2.

In this embodiment, the glass plate is of thickness 1 mm, although any convenient thickness may be used, and the various deposited layers are each of a thickness between 0.05 mm and 1 micron, as per standard TFT manufacturing processes, except for the second SiN layer 62 which in this example is 2 microns and the powderblast resist layers 42 and 43. The powderblast resist layers 42 and 43 are discussed in more detail below The thickness of the second SiN layer 62 defines the height of the acoustic chamber of the finished microphone, so will in fact be chosen in part according to the required acoustic response properties of the microphone. However, there is a trade-off with process costs in that thicker layers take longer to produce, and furthermore in this embodiment there is a trade-off with optimum TFT characteristics. Consequently, the thickness may be selected as desired in the light of these trade-offs.

Unless otherwise stated, all the layers are deposited in conventional fashion, and patterned and etched using standard photolithographic and etching techniques, as described for example in U.S. Pat. No. 5,130,829. Any further details of the parts of the display substrate 1 other than those related to the integrated inclusion of the microphone 10, (i.e. the pixel 4, the other pixels and gate leads and other external connections not shown, and other active matrix components not shown, such as row and column address conductors) are likewise provided and implemented in conventional fashion, again as described for example in U.S. Pat. No. 5,130,829.

The powderblasting process carried out at step s24 in the above process is an example of powderblasting and is a known process for mechanically removing solid material. Powderblasting, and powderblast resists, are discussed for example in the reference H. J. Lighart, P. J. Slikkerveer, F. H. In't Veld, P. H. W. Swinkels and M. H. Zonneveld, Philips Journal of Research, Vol. 50, No. 3/4 p.475–499 (1996). Powderblasting is used for example to produce a rib-structure in the manufacture of some types of plasma display panels.

In this embodiment the second powderblast resist layer 43 is subjected to powderblasting throughout the powderblasting step s24, and hence is required to be a relatively strong and thick layer. The material used for the second powderblast resist 43 is Ebecryl 270™, (available from UCB Chemicals, Netherlands), which is a photosensitive elastomeric polymer based on polyurethane acrylate. This comes in liquid form and is applied using a doctor blade, giving a thickness of approximately 100 microns. This is patterned using photolithography. It will be appreciated that other polymers or mask materials may be used instead.

The first powderblast resist layer 42 is however only exposed to powderblasting toward the end of the powderblasting step s24 when the powderblasting has removed substantially all the thickness of the glass plate 2 in the cavity 28. It is therefore possible to use a thinner layer and/or weaker material for the first powderblast resist layer 42, and hence in this embodiment the material used is polyimide, and this is applied (at step s4) by spin coating to a few microns thickness and patterned using photolithography. This use of a thin polyimide layer is particularly compatible with the thin layers subsequently deposited thereon to form the microphone 10. As the polyimide is however not of optimum resistance with respect to powderblasting, the powderblasting step s24 is preferably carefully timed so that the polyimide layer is only exposed to the minimum powderblasting required to remove the glass from the cavity 28. In other embodiments, such careful timing (or equivalent process control) may be relaxed by employing a thicker and/or stronger material for the first powderblast resist layer 42, for example by using the same material as used for the second powderblast resist layer 43, although this provides a less compatible layer thickness.

Also, in other embodiments, powders other than iron pellets, for example glass beads, silica or alumina particles may be used. Also, other mechanical means for removing the glass to form the cavity 28 may be used instead of powderblasting.

Instead of the glass plate 2, a plate of some other material may be used, for example a quartz or plastic plate as used in some liquid crystal display devices. A further possibility is a silicon plate, as used for example in so-called liquid crystal on silicon (LCOS) display devices.

The process described above for forming the TFT 69 is a standard six-mask bottom gate back channel etch, which provides an active matrix substrate for a transmissive display. Alternatively, other types of TFT may be employed (e.g. top gate, field shielded pixel, or bottom gate etch stop), some of which may use a reduced mask count. Further, the display substrate may be for a reflective or transflective display, rather than a transmissive display. Yet further, the invention may be applied to other types of active matrix display substrates, for example ones using thin film diodes as opposed to TFTs.

One particular advantage of the above embodiment is that all the layers used to produce the microphone 10 are used in the formation of the TFT 69, thus simplifying the overall production process. However, in other embodiments, one or more of such layers may be deposited separately in the microphone area compared to the TFT area so that the thickness and/or choice of material may be optimised separately for the TFT and the microphone. This still advantageously shares process flow aspects.

In other embodiments the microphone may instead be integrated on the passive display substrate, i.e. the glass plate 16 that has the common electrode 18 thereon, rather than the active display substrate. Although this shares less process flow aspects, this will still provide, at least to a degree, the earlier described advantages with respect to saving space etc. in an end product requiring a display device and an acoustic transducer. Likewise, in other embodiments the microphone may be integrated on a display substrate of a liquid crystal display device in which both display substrates are of the passive type, i.e. a passive matrix liquid crystal display.

It will be appreciated that the present invention may be also be applied to any type of display device that includes a suitable display substrate. This includes, inter alia, the following: a plasma display device; a field emission display device; a polymer light emitting diode display device; and an organic light emitting diode display device. In the case of a plasma display device, efficiencies in the production process may be achieved if powderblasting is already used in the production process of the plasma display device.

In the above embodiment the shape of the microphone as viewed from above the glass plate is substantially circular. Since the shape is merely defined by masks (i.e. photoresist and powderblast resist) other shapes may be used as required, which represents an advantage of the use of powderblasting.

Other types of microphone, for example an electret microphone, may be provided instead of the condenser type microphone of the above embodiment.

The microphone provided in the above embodiment may also be used, i.e. constitute, a speaker, if it is excited by application of an electrostatic field between the two electrodes thereof. By varying the electrostatic field (i.e. by varying an alternating voltage applied between the two electrodes) movement of the vibrating diaphragm is achieved thus producing the required sound. In other embodiments, a piezoelectric buzzer may be provided on the display substrate instead of a microphone.

In further embodiments, instead of a single acoustic transducer, more than one acoustic transducer, comprising any combination of single or plural microphones, speakers or piezoelectric buzzers, may be formed on the display substrate.

The thin film layers used for the display elements and the acoustic transducer(s) may also be used to produce integral semiconductor circuitry required for operation of the acoustic transducer.

In the main embodiment described above, processing efficiency is achieved by virtue of forming the display elements and the acoustic transducer in parallel as the display substrate is built up on the glass plate. As already mentioned, if it is desired to optimise one or more layers separately for the display elements or the acoustic transducer, then individual layers may be deposited or processed separately in the respective areas, with the other area either being masked from deposition or having unnecessary layers removed therefrom. However, in some circumstances overall production may be more efficient if the acoustic transducer and the display elements are provided on the display substrate in quite separate processes, i.e. the display elements are formed first, and then the acoustic transducer, or vice-versa. This may be the case, for example, where a standard design of display area is required to be combined with various types, numbers, sizes, or positions of acoustic transducers.

Furthermore, discrete acoustic transducers may be provided by forming just the acoustic transducer part of the above embodiments, without display elements.

Further embodiments that are particularly suited to separate formation of the acoustic transducer will now be described with reference to FIGS. 5 to 7. It will be appreciated that, in the same way as with the embodiments of FIGS. 1 to 4, the embodiments of FIGS. 5 to 7 allow the provision of acoustic transducers on display substrates (with display elements added either previously or afterwards), as well as the provision of separate discrete acoustic transducers by forming just the acoustic transducer part to be described, without display elements.

Figure 5:
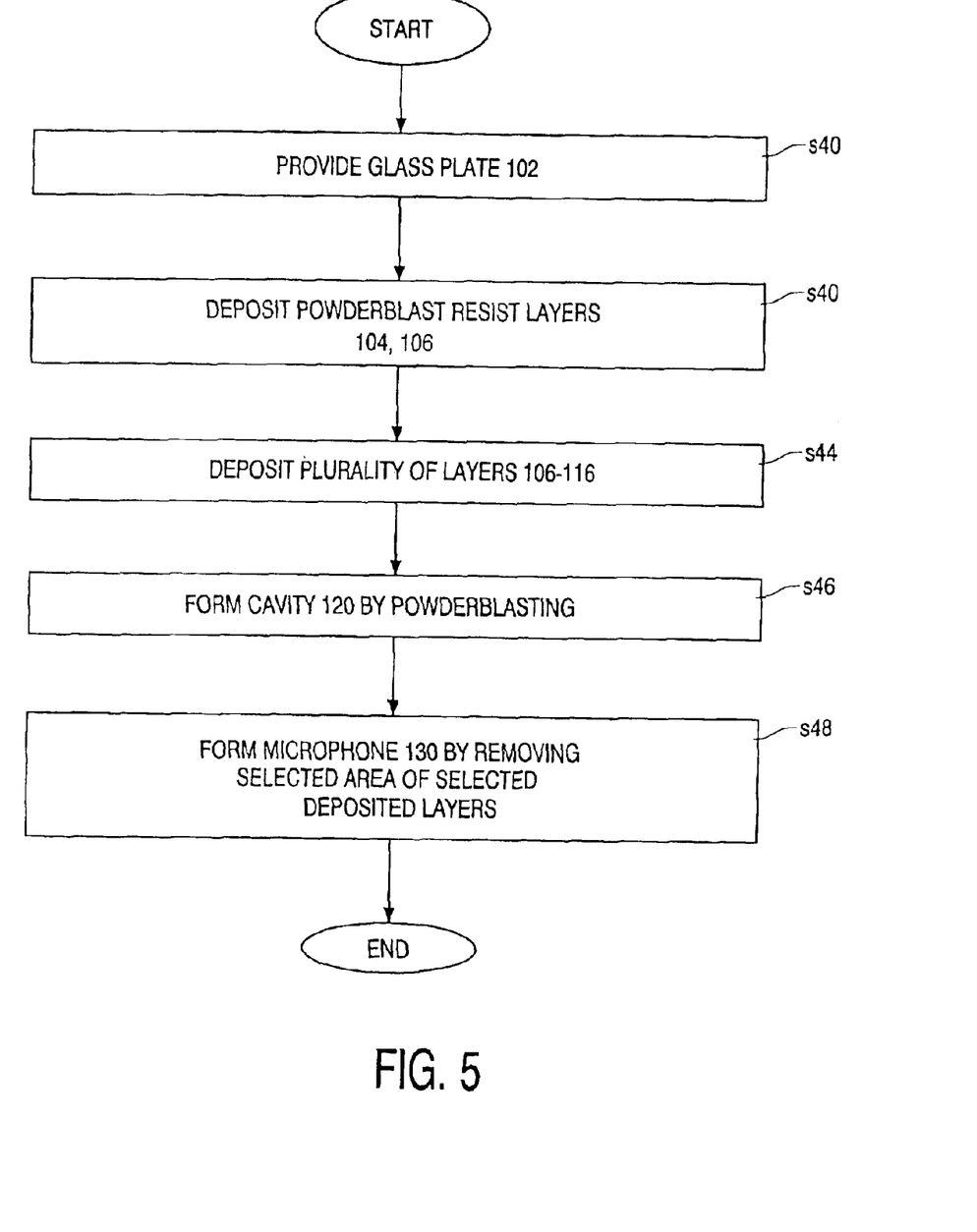
FIG. 5 is a flowchart showing the process steps employed for producing a condenser microphone.

FIG. 5 shows the process steps employed in a further condenser microphone embodiment. These process steps will now be described, with the aid of FIGS. 6a and 6b which schematically illustrate the build-up of the features of the microphone.

Figure 6A:
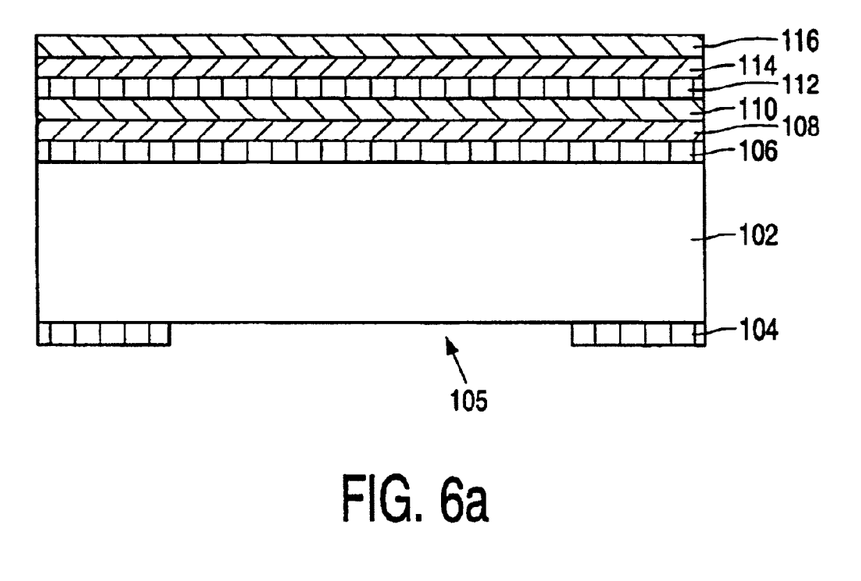
FIGS. 6a and 6b schematically illustrate the build-up of the features of the condenser microphone as the process of FIG. 5 progresses.

The features shown in FIG. 6a are formed as follows. At step s40, a glass plate 102, of thickness 0.7 mm, is provided. At step s42 a bottom powderblast resist layer 104 is deposited on the bottom surface of the glass plate 102 and patterned with a gap 105 in the area corresponding to where the microphone is to be provided, and a top powderblast resist layer 106 is deposited on the top surface of the glass plate 102. In this embodiment, both the powderblast resist layers 104, 106 are of Ebecryl 270™ (available from UCB Chemicals, Netherlands) which was discussed earlier in relation to the first main embodiment, and of a thickness of about 100 microns. Furthermore, in the present embodiment, the possibilities and influences of the choice of powderblast resist are the same as in the first main embodiment. At step s44, various layers are successively deposited on the top surface of the glass plate 102, each to a thickness of between 0.05 mm and 1 microns (but as in the other embodiments, the thicknesses may of course be varied as required). The layers are, in order of deposition, a first SiN layer (i.e. insulating layer) 108, a bottom chromium layer 110 (to serve as a conductor), an aluminium layer 112 (which will serve as a sacrificial layer), a second SiN layer (i.e. insulating layer) 114, and a top chromium (or other metal) layer 116 (to serve as a conductor). Thus the overall structure shown in FIG. 6a is arrived at.

Figure 6B:
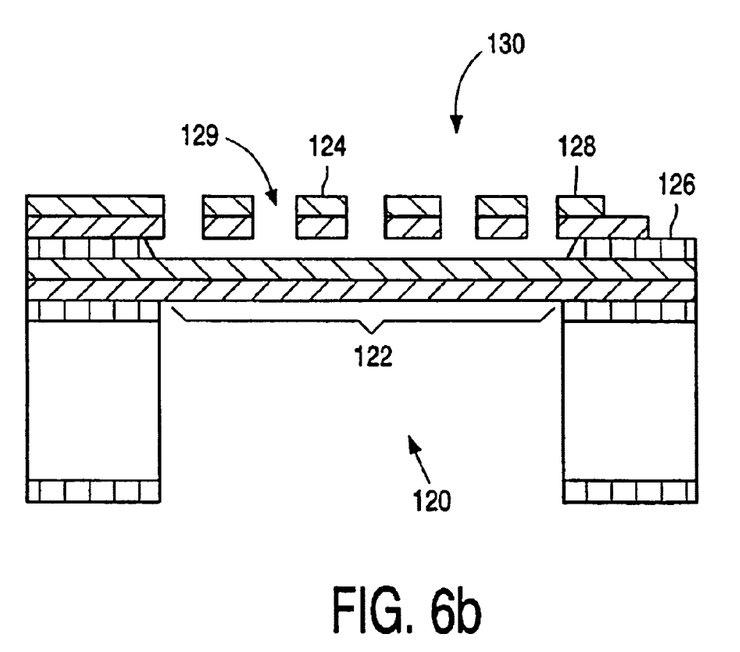

The additional features shown in FIG. 6b are formed as follows. At step s46, powderblasting is performed to provide a cavity 120 is provided in the glass plate, extending the whole depth of the glass plate 102, in the area where the diaphragm of the microphone is to be provided. At step s48, various layers are removed in selected areas i.e. the remaining powderblast resist from the top powderblast resist layer 106 at the area of the cavity 120; the sacrificial aluminium layer 112 in this area; and selected areas in the second SiN layer 114 and the top metal layer 116 (for providing acoustic air holes and electrical contacts to underlying layers). This results in a completed microphone 130, comprising a vibrating diaphragm 122 (the vibrating diaphragm 122 comprising the first SiN layer 108 and the bottom chromium layer 110 in the area over the cavity 120), a fixed electrode structure 124 (the fixed electrode structure 124 comprising the top metal layer 116 and the second SiN layer 114 in the area over the diaphragm 122, and further comprising acoustic air holes 129 therein), a contact 128 for the fixed electrode and a contact 126 for the vibrating electrode.

As described with respect to the microphone of the first main embodiment, the structure of FIG. 6b may also be used to provide a speaker rather than a microphone.

In all of the above embodiments, the cavity over which the vibrating diaphragm is located is formed by removing material from the glass plate (e.g. glass plate 2 or glass plate 102). In other embodiments, the cavity may be formed instead by providing one or more sacrificial layers between the glass plate and the layers that will form the vibrating diaphragm, then removing the sacrificial layer(s) to produce the cavity in the space vacated by the sacrificial layer(s). Any appropriate material may be used for the sacrificial layer(s), including for example SiN, Al, or organic material such as photoresist.

Figure 7A:
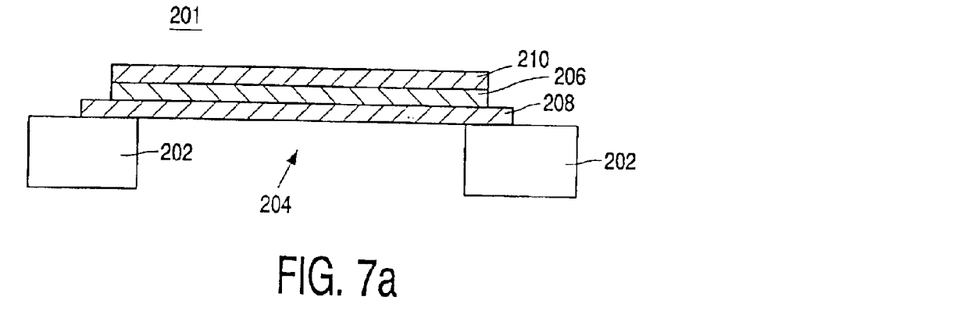
FIG. 7a is a schematic illustration of a piezoelectric buzzer comprising a diaphragm over a cavity.

In a further embodiment, an acoustic transducer comprising a piezoelectric buzzer, schematically illustrated in FIG. 7a, is provided. The piezoelectric buzzer 201 comprises a glass plate 202 with a cavity 204, of rectangular area, sized as required for acoustic properties, in this example approximately 10 mm×10 mm, formed therein by powderblasting such as to extend through the whole depth of the glass plate 202.

A square shaped plate of piezoelectric material 206, in this embodiment lead zircanoate titanate (PZT) of thickness as required for acoustic properties, in this example of the order of 100 microns, and of approximate area 10 mm×10 mm, is provided with electrodes 208 and 210 on the top and bottom surfaces thereof. The plate of piezoelectric material 206 is bonded to the glass plate 202, over the cavity 204, thereby providing the piezoelectric transducer 201. In this embodiment the plate of piezoelectric material 206 is bonded to the glass plate 202 along substantially the whole of the perimeter of its square area, thereby forming a diaphragm.

Figure 7B:
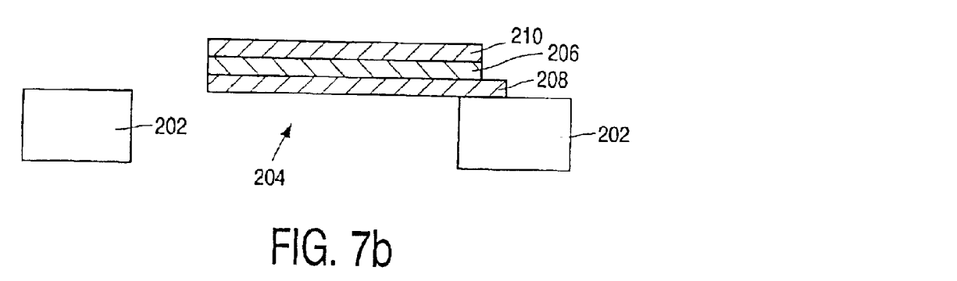
FIG. 7b is a schematic illustration of a piezoelectric buzzer comprising a cantilever over a cavity.

The plate of piezoelectric material 206 may alternatively be made slightly smaller than the area of the cavity 204, and bonded along only one side thereof, thereby forming a cantilever, as shown in FIG. 7b.

Figure 7C:
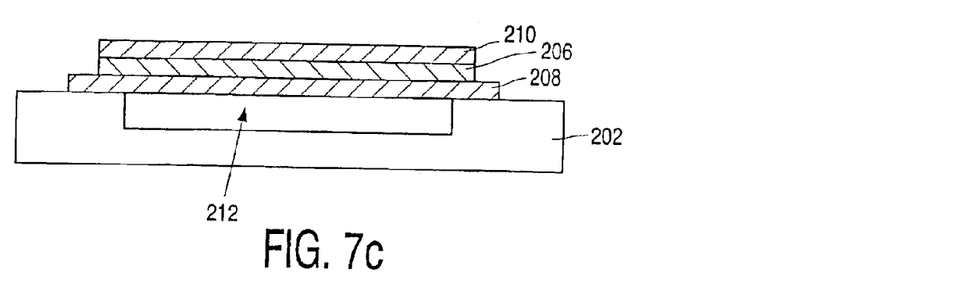
FIG. 7c is a schematic illustration of another piezoelectric buzzer comprising a diaphragm over a cavity.
Figure 7D:
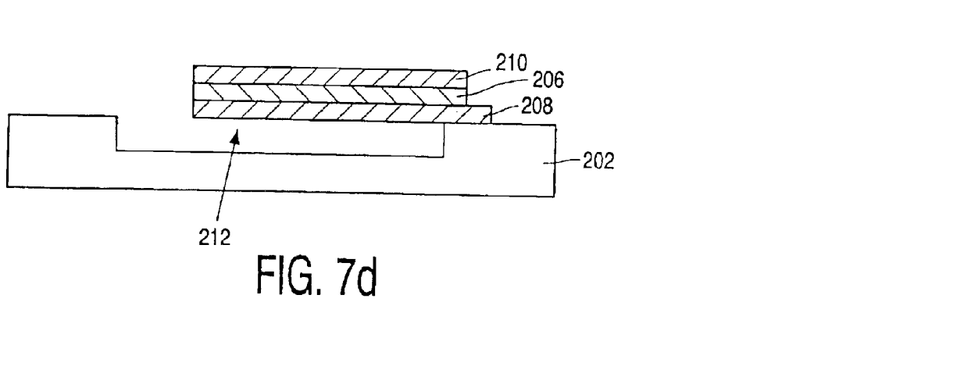
FIG. 7d is a schematic illustration of another piezoelectric buzzer comprising a cantilever over a cavity.

The diaphragm or cantilever may alternatively be provided over a cavity 212, again produced by powderblasting, that differs from the cavity 204 in that it only extends through some of the depth of the glass plate 202, as shown in FIG. 7c (for the diaphragm) and FIG. 7d (for the cantilever).

The plate of piezoelectric material 206 with electrodes thereon may conveniently be provided by applying a plurality of electrodes over respective areas of a larger sheet of piezoelectric material and then cutting the processed sheet into individual electrode coated plates 206.

The cavity 204, 212 and plate of piezoelectric material 206 may be formed in shapes other than square.

The piezoelectric buzzer 201 is operated by applying an alternating voltage between the two electrodes 208, 210.

It will be appreciated that the above examples of provision of display substrates (e.g. liquid crystal display substrates) and acoustic transducers (e.g. microphones) are described by way of example only, and that the invention may be applied to the provision of any other appropriate type of display substrate and/or acoustic transducer. Likewise, layer characteristics, such as type of material and thickness, are merely exemplary.

From reading the present disclosure, other variations and modifications will be apparent to persons skilled in the art. Such variations and modifications may involve equivalent and other features which are already known in the design, manufacture and use of display devices and acoustic transducers, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention. Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

What is claimed is:

1. A display substrate, comprising:
a plate;
at least one display element formed on the plate; and
an acoustic transducer formed on the plate over a cavity;
wherein the cavity is formed in the plate.

2. A display substrate according to claim 1, wherein the acoustic transducer is a microphone or a speaker, and comprises a fixed electrode and a diaphragm comprising a vibrating electrode.

3. A display substrate, comprising:
a plate;
at least one display element formed on the plate; and
an acoustic transducer formed on the plate over a cavity;
wherein
the acoustic transducer is a microphone or a speaker, and comprises a fixed electrode and a diaphragm comprising a vibrating electrode, and
the vibrating electrode is formed from a same layer of conductor as at least a
first part of the one or more display elements.

4. A display substrate, comprising:
a plate;
at least one display element formed on the plate; and
an acoustic transducer formed on the plate over a cavity;
wherein
the acoustic transducer is a microphone or a speaker, and comprises a fixed electrode and a diaphragm comprising a vibrating electrode, and
the fixed electrode is formed from a same layer of conductor as at least a second part of the one or more display elements.

5. A display substrate according to claim 2, wherein the diaphragm further comprises an insulation layer.

6. A display substrate according to claim 5, wherein the insulation layer of the diaphragm is formed from a same insulation layer as at least a part of the at least one display component.

7. A display substrate according to claim 3, wherein the cavity is between the acoustic transducer and a surface of the plate.

8. A display substrate according to claim 3, wherein the cavity is formed in the plate.

9. A display substrate according to claim 1, wherein the cavity extends the whole depth of the plate.

10. A display substrate according to claim 1, wherein the cavity is a powderblasted cavity.

11. A display substrate, comprising;
a plate;
at least one display element formed on the plate; and
an acoustic transducer formed on the plate over a cavity;
wherein
the at least one display element forms an active matrix array such that the display substrate is an active matrix substrate for a liquid crystal display device.

12. A display substrate according to claim 11 wherein the active matrix array comprises thin-film-transistors and the vibrating electrode is formed from a same layer of conductor as the gates of the thin-film-transistors.

13. A display substrate according to claim 11, wherein the active matrix array comprises pixel electrodes and the fixed electrode is formed from a same layer of conductor as the pixel electrodes.

14. A display substrate according to claim 8, wherein the at least one display element is a common electrode such that the display substrate is a passive substrate for a liquid crystal display device.

15. A display substrate according to claim 3, wherein the at least one display element forms an active matrix array such that the display substrate is an active matrix substrate for a liquid crystal display device.

16. A display substrate according to claim 15, wherein the active matrix array comprises thin-film-transistors and the vibrating electrode is formed from a same layer of conductor as the gates of the thin-film-transistors.

17. A display substrate according claim 4, wherein the at least one display element forms an active matrix array such that the display substrate is an active matrix substrate for a liquid crystal display device.

18. A display substrate according to claim 17, wherein the active matrix array comprises thin-film-transistors and the vibrating electrode is formed from a same layer of conductor as the gates of the thin-film-transistors.

19. A display substrate according to claim 17, wherein the active matrix array comprises pixel electrodes and the fixed electrode is formed from a same layer of conductor as the pixel electrodes.

20. A display substrate according to claim 4, wherein the cavity is between the acoustic transducer and a surface of the plate.

21. A display substrate according to claim 4, wherein the cavity is formed in the plate.

22. A display substrate according to claim 11, wherein the acoustic transducer is a microphone or a speaker, and comprises a fixed electrode and a diaphragm comprising a vibrating electrode.

23. A display substrate according to claim 11, wherein the cavity is between the acoustic transducer and a surface of the plate.

24. A display substrate according to claim 11, wherein the cavity is formed in the plate.

* * * * *